Aug. 26, 1924.  
H. M. PITMAN  
FRUIT CUTTER  
Filed Aug. 31, 1922   2 Sheets-Sheet 1
1,506,499
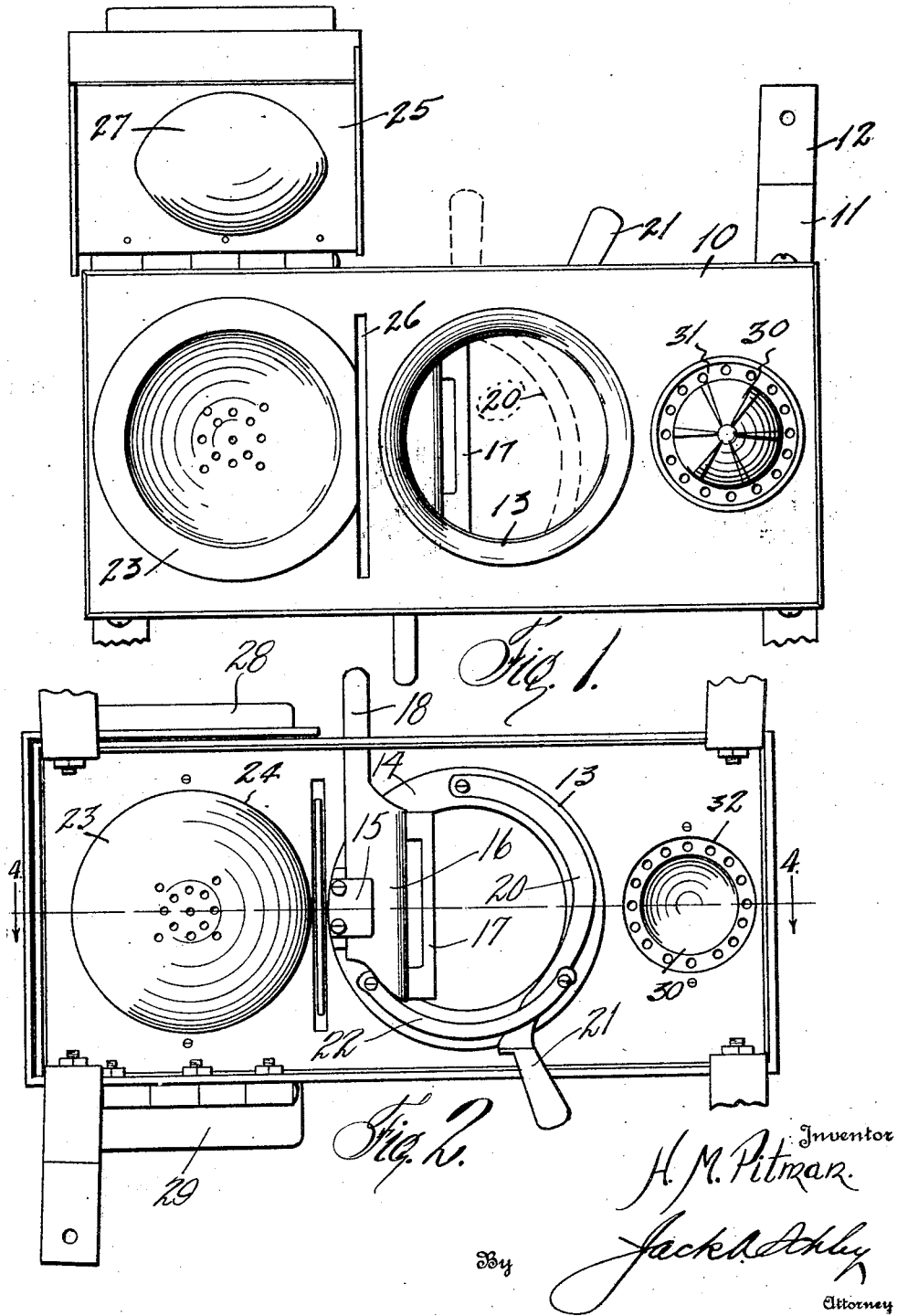

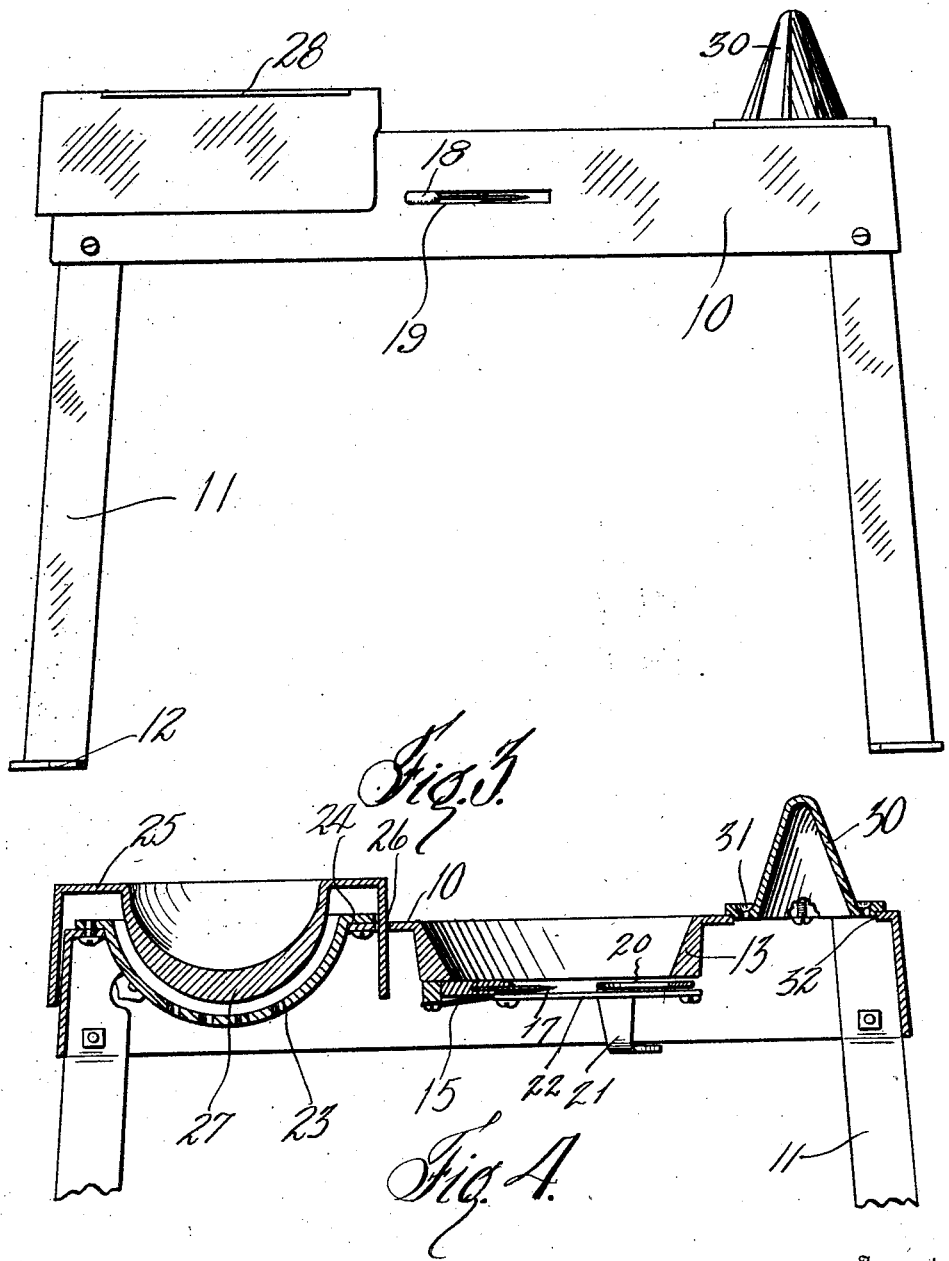

Patented Aug. 26, 1924.

1,506,499

UNITED STATES PATENT OFFICE.

HENRY M. PITMAN, OF DALLAS, TEXAS.

FRUIT CUTTER.

Application filed August 31, 1922. Serial No. 585,405.

*To all whom it may concern:*

Be it known that I, HENRY M. PITMAN, a citizen of the United States, residing at Dallas, in the county of Dallas and State of Texas, have invented certain new and useful Improvements in Fruit Cutters, of which the following is a specification.

This invention relates to new and useful improvements in fruit cutters.

The object of the invention is to provide a device whereby fruit such as an orange, a lemon or a lime may be conveniently severed, thus making for a great saving in time and convenience in operation, such as is highly desirable in the dispensing of soft drinks and the like.

A further object is to provide a cutter which may be quickly and easily set to the general size of the particular kind of fruit to be cut.

An important feature of the invention is to provide a cutter member or knife having a removable blade of a simple nature, whereby a reversible blade may be used and sharp blade substituted when necessary.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a plan view of a device constructed in accordance with my invention,

Fig. 2 is an under side view of the same,

Fig. 3 is a front elevation, and

Fig. 4 is a longitudinal sectional view on the line 4—4 of Fig. 2.

In the drawings the numeral 10 designates a table or support mounted on legs 11 which have outwardly directed feet 12 whereby the device may be fastened on a counter, shelf or other support. At the center of the table I provide a counter-sunk annular flange 13 which is dished to conform to the general shape of the fruit. This flange depends from the under side of the table and has a flat transverse bottom edge 14. At one side of the edge is mounted a spring keeper or clip 15 having its side toward the center of the flange, open. A knife or cutter holder 16 is frictionally engaged in the keeper and is provided with a longitudinal slit into which a cutter blade 17 may be partially inserted. The holder has a handle 18 extending thru a slot 19 in the apron of the table. The slot is wide enough to permit the knife to be withdrawn and inserted therethru.

The edge of the blade extends across the opening of the flange and when fruit is dropped into the flange a substantially half portion will hang below the knife. In order to assure this for various sizes of fruit I provide a gauge arm 20, which is curved and has one end pivoted to the edge 14. The other end of the arm has a handle 21 supported in an arcuate keeper 22 which limits its movement. The handle is bent downwardly and outwardly so as to extend under the apron of the table. By swinging the handle 21 toward the knife the arm is moved into the opening of the flange so as to support fruit which would otherwise fall thru the opening.

By single movement the fruit may be inserted in the flange and pushed toward the blade 17. This will sever the fruit, the upper half remaining in the hand of the operator and the lower half falling to the support on which the device is mounted. This operation may be quickly carried out.

At one end of the table a bowl 23 is fastened in an opening 24 and is provided with perforations. A cover member 25 is hinged on the rear side of the table and has marginal flanges, one of which passes thru a transverse slot 26 in the table when the cover is swung downwardly. The cover has a depending semi-spherical boss 27 hanging substantially concentrically in the bowl when the cover is closed.

The cover has a lip 28 overhanging the front side and a second lip 29 overhanging the rear hinged side. This second lip engages with the apron of the table when the cover is swung upward and acts as a stop. The lip 28 offers a means of engagement for lifting the cover. When it is desired to squeeze the severed fruit, the cover is raised and the half placed in the bowl 23. The cover is swung down so that the boss 27 engages the fruit and squeezes the juice from the same and this juice passes thru the perforations to a glass thereunder.

In the case of smaller fruits such as limes, small lemons and the like, a coring extractor comprising a ribbed macerating cone 30, is used. The cone is surrounded by a trough 31 provided with perforations. The trough fits in an opening 32 in the table. By inverting the half fruit and rotating it on the cone the juice flows down to the trough and passes thru the perforations.

In using the device the operator picks up the fruit with one hand and with the other hand adjusts the arm 20 to gauge the severing line of the fruit, which can be done by holding the fruit in the opening of flange 13 against the cutter 17 until the arm is engaged therewith. While still holding the fruit the operator merely has to push the same toward the cutter to sever it. Still holding the upper half in the same hand he places it in the bowl 23 and closes the cover 25. By pressing down on the cover the juice is extracted and may be caught in a glass placed under the bowl.

If the fruit is small, the severed half is inverted, placed on the cone 30 and rotated, the juice passing thru the perforations 31 into a glass thereunder. The use of the cone is much faster than the squeezer and therefore it is desirable to have both on the table 10.

Various changes in the size and shape of the different parts as well as modifications may be made within the scope of the appended claims.

What I claim, is:

1. In a device of the character described, the combination of an elevated support, a flanged opening in said support, a keeper on said flange, a fruit severing knife removably mounted in said keeper and having a blade extending across said opening, a gauge arm mounted on said flange and adapted to swing into said flanged opening for supporting fruit of various sizes.

2. In a device of the character described, the combination of an elevated support, a flanged opening in said support, a clip on said flange, a fruit severing knife removably mounted in said clip and having a blade extending across said opening, a curved gauge arm pivoted on said flange for supporting fruits of various sizes in said opening, and a keeper supporting said arm.

In testimony whereof I affix my signature.

HENRY M. PITMAN.